United States Patent
Park et al.

(10) Patent No.: US 8,761,514 B2
(45) Date of Patent: Jun. 24, 2014

(54) CHARACTER RECOGNITION APPARATUS AND METHOD BASED ON CHARACTER ORIENTATION

(75) Inventors: Jeong-Wan Park, Seoul (KR); Sang-Wook Oh, Ansan-si (KR); Do-Hyeon Kim, Suwon-si (KR); Hee-Bum Ahn, Seoul (KR)

(73) Assignee: Samsung Electronics Co., Ltd (KR)

( * ) Notice: Subject to any disclaimer, the term of this patent is extended or adjusted under 35 U.S.C. 154(b) by 527 days.

(21) Appl. No.: 13/036,875

(22) Filed: Feb. 28, 2011

(65) Prior Publication Data

US 2011/0211759 A1 Sep. 1, 2011

(30) Foreign Application Priority Data

Feb. 26, 2010 (KR) .................. 10-2010-0017930

(51) Int. Cl.
*G06K 9/18* (2006.01)
(52) U.S. Cl.
USPC ........... 382/182; 382/156; 382/175; 382/177; 382/194
(58) Field of Classification Search
CPC .......... H04N 1/40062; G06K 2209/01; G06K 2209/00; G06K 9/3275; G06K 9/3283
USPC ................... 382/182, 187, 177, 185
See application file for complete search history.

(56) References Cited

U.S. PATENT DOCUMENTS

| | | | | |
|---|---|---|---|---|
| 5,243,668 A * | 9/1993 | Kitamura et al. | ............. | 382/256 |
| 5,572,602 A * | 11/1996 | Naoi et al. | .................... | 382/178 |
| 5,673,337 A * | 9/1997 | Gallo et al. | ................... | 382/187 |
| 5,999,647 A | 12/1999 | Nakao et al. | | |
| 6,005,976 A * | 12/1999 | Naoi et al. | .................... | 382/202 |
| 6,026,177 A * | 2/2000 | Mong et al. | .................... | 382/156 |
| 6,104,833 A * | 8/2000 | Naoi et al. | .................... | 382/190 |
| 6,111,982 A * | 8/2000 | Adachi | ......................... | 382/176 |
| 6,289,123 B1 * | 9/2001 | Xiaomang et al. | ........... | 382/181 |
| 6,460,155 B1 * | 10/2002 | Nagasaki et al. | ............ | 714/752 |
| 6,567,545 B1 * | 5/2003 | Kobara et al. | ................ | 382/175 |
| 6,850,645 B2 * | 2/2005 | Naoi et al. | .................... | 382/190 |
| 6,898,315 B2 * | 5/2005 | Guha | ............................ | 382/187 |
| 6,983,133 B2 * | 1/2006 | Park | .......................... | 455/127.2 |
| 7,020,307 B2 * | 3/2006 | Hinton et al. | ................ | 382/109 |
| 7,174,044 B2 * | 2/2007 | Ding et al. | .................... | 382/210 |
| 2001/0053248 A1* | 12/2001 | Maeda | ......................... | 382/165 |
| 2003/0124997 A1* | 7/2003 | Park | .......................... | 455/136 |
| 2005/0238257 A1* | 10/2005 | Kaneda et al. | ............... | 382/305 |
| 2007/0165950 A1* | 7/2007 | Nishida | ........................ | 382/177 |
| 2008/0008383 A1* | 1/2008 | Andel et al. | .................. | 382/173 |
| 2008/0137955 A1* | 6/2008 | Tsai et al. | ..................... | 382/176 |
| 2008/0247677 A1* | 10/2008 | Yoshino | ....................... | 382/305 |

FOREIGN PATENT DOCUMENTS

JP 8-305804 11/1996
KR 1996-0013817 10/1996

* cited by examiner

*Primary Examiner* — Vu Le
*Assistant Examiner* — Aklilu Woldemariam
(74) *Attorney, Agent, or Firm* — The Farrell Law Firm, P.C.

(57) ABSTRACT

A character recognition apparatus and method based on a character orientation are provided, in which an input image is binarized, at least one character area is extracted from the binarized image, a slope value of the extracted at least one character area is calculated, the calculated slope value is set as a character feature value, and a character is recognized by using a neural network for recognizing a plurality of characters by receiving the set character feature value. Accordingly, the probability of wrongly recognizing a similar character decreases, and a recognition ratio of each character increases.

13 Claims, 6 Drawing Sheets

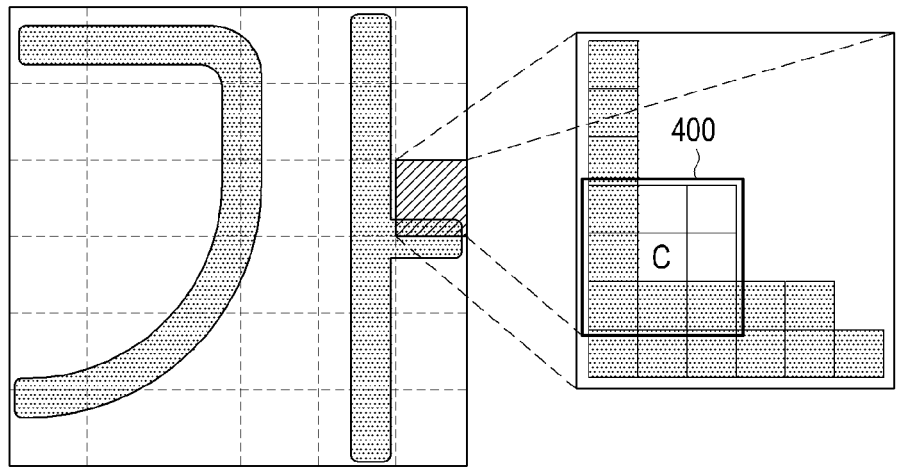
FIG.4A
FIG.4B
FIG.4C
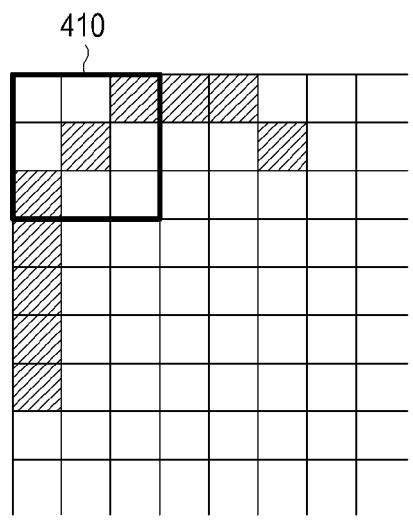
FIG.4D
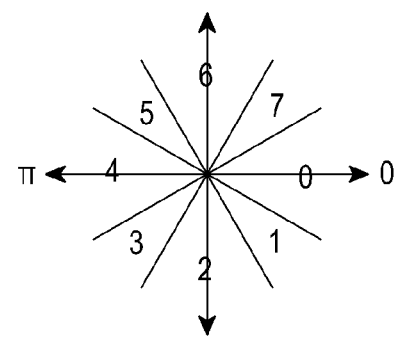
FIG.4E

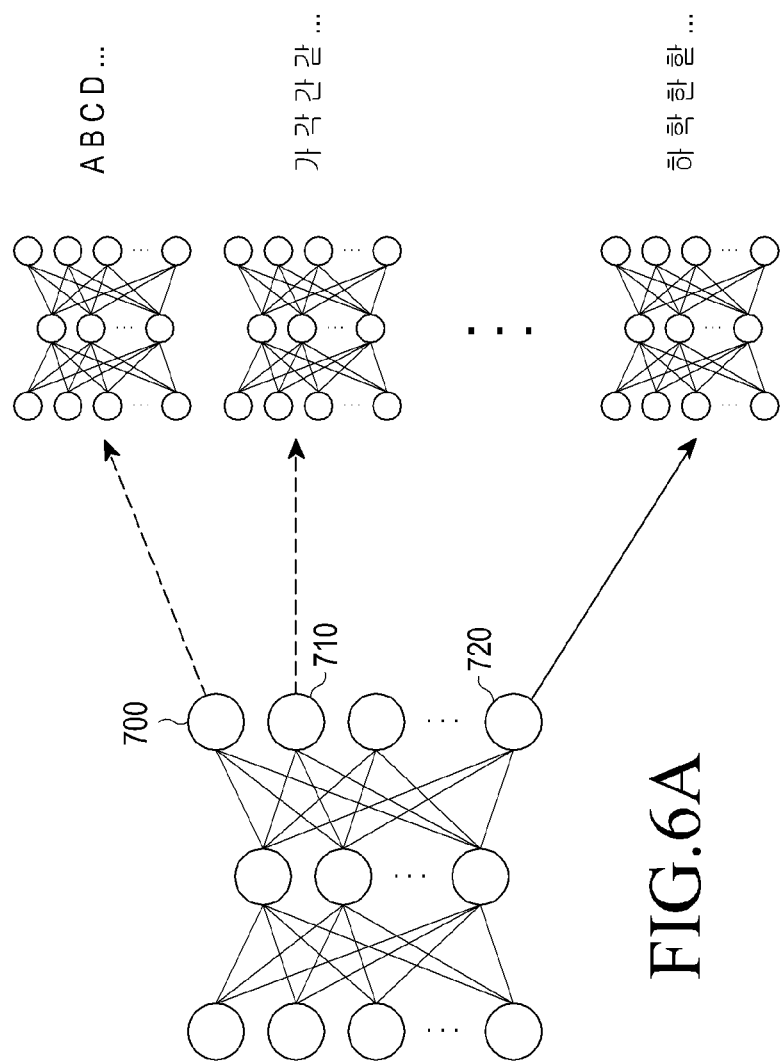

CHARACTER RECOGNITION APPARATUS AND METHOD BASED ON CHARACTER ORIENTATION

PRIORITY

This application claims priority under 35 U.S.C. §119(a) to a Korean patent application filed in the Korean Intellectual Property Office on Feb. 26, 2010 and assigned Serial No. 10-2010-0017930, the entire disclosure of which is incorporated herein by reference.

BACKGROUND OF THE INVENTION

1. Field of the Invention

The present invention relates generally to an apparatus and method for character recognition, and, more particularly, to an apparatus and method for recognizing characters by calculating feature values according to the orientation of each of the characters and classifying the calculated feature values by character type.

2. Description of the Related Art

General character recognition is widely used in fields such as optical character recognition, automatic mail sorting, document recognition, and drawing recognition, as a field of pattern recognition for recognizing and understanding characters by using vision information.

Such a character recognition method includes a character recognition method using a mesh feature, a character recognition method using a directional angle feature, a character recognition method using a stroke orientation feature, a method using the size of a Kirsch mask, a grapheme-based Korean character recognition method, and a character recognition method according to 6 forms of Hangul (Korean) characters.

The character recognition method using a mesh feature is a method of dividing an area to be recognized into several sub-areas and using a density value of black colored pixels existing in each sub-area as a feature.

The character recognition method using a directional angle feature is a method of extracting a direction vector based on distribution of pixels and using the extracted direction vector as a feature. Since direction vectors are extracted for all directions of pixels in a mask window, various pixel patterns can be considered.

The character recognition method using a stroke orientation feature is a method of calculating percentages of length values of a horizontal stroke, a vertical stroke, a left 45-degree diagonal line, and a right 45-degree diagonal line for black colored pixels and using the percentages as a feature.

The method using the size of a Kirsch mask is a method of extracting 3×3 Kirsch masks for a horizontal angle, a vertical angle a right 45-degree angle, and a left 45-degree angle and using size information of the Kirsch masks as a feature.

The grapheme-based Korean character recognition method is classified into a method of extracting characters by using the above-described features, recognizing the characters based on a feature value on a grapheme basis, and combining a result of the recognition and a method of recognizing characters in which graphemes are combined.

The character recognition method according to the 6 forms of Hangul is a method of classifying combinations of an initial consonant and a vertical vowel, combinations of an initial consonant and a horizontal vowel, combinations of an initial consonant, a horizontal vowel and a vertical vowel, initial consonants, vertical vowels, and the like by using a type classification neural network according to the 6 forms of Hangul and forming a recognizer with a neural network or a Hidden Markov Model (HMM) suitable for each form.

As described above, characters are conventionally recognized by using the character recognition method described above.

However, the character recognition method using a mesh feature has a low recognition ratio since it is difficult to distinguish similar Korean fonts, such as "○" and "□", from each other, and the character recognition method using a directional angle feature has a low recognition ratio for characters, such as Korean characters, requiring a weight on a diagonal stroke since the same weight is used for every direction in a process of performing grouping with arbitrary angles and setting weights for features.

Additionally, since the character recognition method using a stroke orientation feature is based on a stroke length, when strokes are cut or exist with a trivial shade, a stroke length value varies, so it is difficult to use the stroke orientation feature as a robust feature, and although the method using the size of a Kirsch mask extracts and uses 8-direction or 4-direction edge information, since the method using the size of a Kirsch mask utilizes size information obtained by calculating an absolute value rather than orientation information according to the edge information, it is difficult to distinguish an inward orientation of a stroke from an outward orientation of the stroke.

Additionally, when Korean characters are recognized on a grapheme basis, since Korean characters consist of 19 initial sounds, 21 media sounds, and 27 final sounds, the number of possible fonts is 11,172. Accordingly, the grapheme-based Korean character recognition method has a high chance of outputting unused syllables due to combinations of the 19 initial sounds, 21 media sounds, and 27 final sounds rather than recognition of 2,350 completion type Korean fonts. Moreover, it is not easy to separate graphemes, and the grapheme-based Korean character recognition method has a low recognition ratio for fonts including a medial sound, such as "-", "⊥", or "ㅜ", when strokes of the fonts are thick.

The character recognition method, according to the 6 forms of Hangul consists of 149 first-form Korean fonts, 91 second-form Korean fonts, 109 third-form Korean fonts, 1069 fourth-form Korean fonts, 585 fifth-form Korean fonts, and 347 sixth-form Korean fonts. Thus, the character recognition method, according to the 6 forms of Hangul has a high recognition ratio for the first, second, and third-form Korean fonts having a relatively small number of fonts to be distinguished, whereas the character recognition method according to 6 forms of Hangul has a relatively low recognition ratio for the fourth, fifth, and sixth-form Korean fonts having a large number of fonts to be distinguished.

SUMMARY OF THE INVENTION

The present invention has been made to address at least the above problems and/or disadvantages and to provide at least the advantages below. Accordingly, an object of the present invention is to provide a character recognition apparatus and method based on a character orientation in order to decrease the probability of wrongly recognizing certain characters as similar and increase the recognition ratio of each character.

According to one aspect of the present invention, a character recognition apparatus is provided, including a binarizer for binarizing an input image; a character extractor for extracting at least one character area from the binarized image; a character feature value extractor for calculating a slope value of the extracted at least one character area and setting the calculated slope value as a character feature value;

and a character recognizer for recognizing a character by using a neural network for recognizing a plurality of characters by receiving the set character feature value. According to the present invention, a character feature value is set by using a character orientation, and a character is recognized through a neural network using the set character feature value, thereby increasing the distinction between similar characters and providing a high recognition ratio for Korean characters having a directional angle.

According to another aspect of the present invention, a character recognition method is provided, including binarizing an input image; extracting at least one character area from the binarized image; calculating a slope value of the extracted at least one character area and setting the calculated slope value as a character feature value; and recognizing a character by using a neural network for recognizing a plurality of characters by receiving the set character feature value.

BRIEF DESCRIPTION OF THE DRAWINGS

The above and other objects, features and advantages of the present invention will become more apparent from the following detailed description when taken in conjunction with the accompanying drawing in which:

FIG. 4 illustrates a process of setting a character feature value according to an embodiment of the present invention;

FIG. 6 illustrates a two-stage neural network according to an embodiment of the present invention.

DETAILED DESCRIPTION OF EMBODIMENTS OF THE PRESENT INVENTION

Embodiments of the present invention will be described herein below with reference to the accompanying drawings. In the following description, well-known functions or constructions are not described in detail since they would obscure the invention with unnecessary detail.

Figure 1:
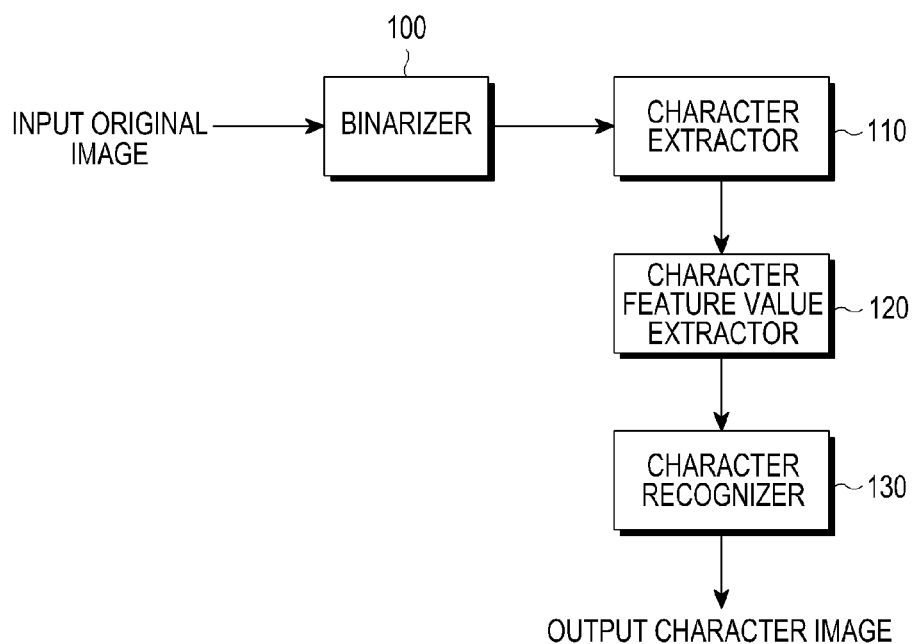
FIG. 1 is a block diagram illustrating a character recognition apparatus according to an embodiment of the present invention.

FIG. 1 is a block diagram illustrating a character recognition apparatus according to an embodiment of the present invention.

Referring to FIG. 1, the character recognition apparatus includes a binarizer 100, a character extractor 110, a character feature value extractor 120, and a character recognizer 130.

If an image is input, the binarizer 100 improves the input image and binarizes the improved image.

The character extractor 110 extracts a character by separating a background area and lines from the binarized image and generates a binarization image of the extracted character.

The character feature value extractor 120 divides the generated binarization image into a plurality of block areas, calculates character slope direction information for each of the plurality of divided block areas, gathers the character slope direction information calculated for each character, and sets the gathered value as a character feature value for each character.

Specifically, the character feature value extractor 120 divides an image area of a specific character into a plurality of blocks, calculates a character slope value for each of the plurality of blocks, counts and accumulates the number of selection times of a plurality of preset slope ranges in which each of the calculated character slope values is included, normalizes the accumulated count value to a value between 0 and 1 for each of the preset slope ranges, and sets the normalized values as a character feature value of the specific character.

The character recognizer 130 receives a character feature value set for each character and includes a character group classification neural network for classifying a character group according to the received character feature value as shown in FIG. 6A and character recognition neural networks for recognizing a character according to the received character feature value for the classified character group as shown in FIG. 6B. Each of these neural networks includes an input layer, a medial layer, and an output layer, wherein the number of nodes in the output layer of a neural network, which correspond to reference numerals 700, 710, and 720 of FIG. 6, is the same as the number of character recognition neural networks. The character recognition neural networks may include, for example, a first neural network for recognizing English characters, numbers, and symbols, a second neural network for recognizing Korean characters starting from "ㄱ", a third neural network for recognizing Korean characters starting from "ㄲ", and so on, a twentieth neural network for recognizing Korean characters starting from "ㅎ".

When a set character feature value is input to the character group classification neural network, the character recognizer 130 learns so that the character group classification neural network outputs a character group including a character having the input character feature value, and inputs the character feature value into a corresponding character recognition neural network, and learns so that the corresponding character recognition neural network outputs the character having the input character feature value.

Specifically, the character recognizer 130 outputs a plurality of character group matching scores through the character group classification neural network according to an input of a character feature value of a specific character. A character group matching score indicates a value indicating a grade matching a character group including a character having an input character feature value.

The character recognizer 130 then compares the greatest of the plurality of output character group matching scores with a preset threshold.

If the greatest character group matching score is greater than or equal to the preset threshold, the character recognizer 130 delivers the character feature value to a corresponding character recognition neural network and determines the greatest of the character matching scores output from the corresponding character recognition neural network as a final result value for character recognition. A character matching score indicates a value indicating a grade matching a character corresponding to an input character feature value.

If the greatest character group matching score is less than the preset threshold, the character recognizer 130 compares the character matching score output after inputting the character feature value to the corresponding character recognition neural network with a character matching score corresponding to the second greatest character group.

The character recognizer 130 then determines whether the character matching score corresponding to the greatest character group is greater than or equal to a value obtained by subtracting a predetermined value from the character matching score corresponding to the second greatest character group.

If the character matching score corresponding to the greatest character group is greater than or equal to the value obtained by subtracting the predetermined value from the character matching score corresponding to the second greatest character group, the character recognizer 130 determines the character matching score corresponding to the greatest character group as a final result value for character recognition.

If the character matching score corresponding to the greatest character group is less than the value obtained by subtracting the predetermined value from the character matching score corresponding to the second greatest character group, the character recognizer 130 determines the character matching score corresponding to the second greatest character group as a final result value for character recognition.

Thus, the present invention calculates character slope direction information for each character and performs character recognition through a two-stage neural network by using the calculated character slope direction information as a character feature value, thereby decreasing the probability of wrongly recognizing a similar character and increasing a recognition ratio of each character.

Figure 2:
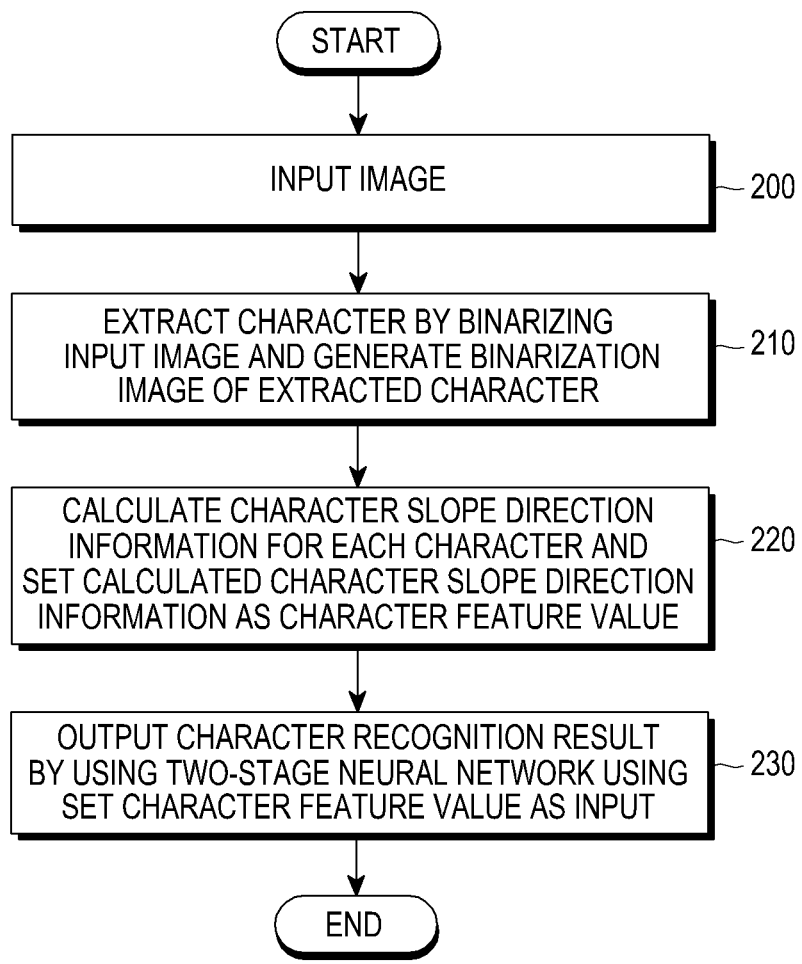
FIG. 2 is a flowchart illustrating a process of recognizing a character in the character recognition apparatus, according to an embodiment of the present invention.

FIG. 2 is a flowchart illustrating a process of recognizing a character in the character recognition apparatus, according to an embodiment of the present invention.

Referring to FIG. 2, if an image is input in step 200, in step 210, the binarizer 100 improves the input image and binarizes the improved image, and the character extractor 110 of FIG. 1 extracts a character by separating a background area and lines from the binarized image and generates a binarization image of the extracted character.

In step 220, the character feature value extractor 120 of FIG. 1 calculates character slope direction information for each character and sets the character slope direction information calculated for each character as a character feature value for the corresponding character.

Step 220 will now be described in detail with reference to FIG. 3.

Figure 3:
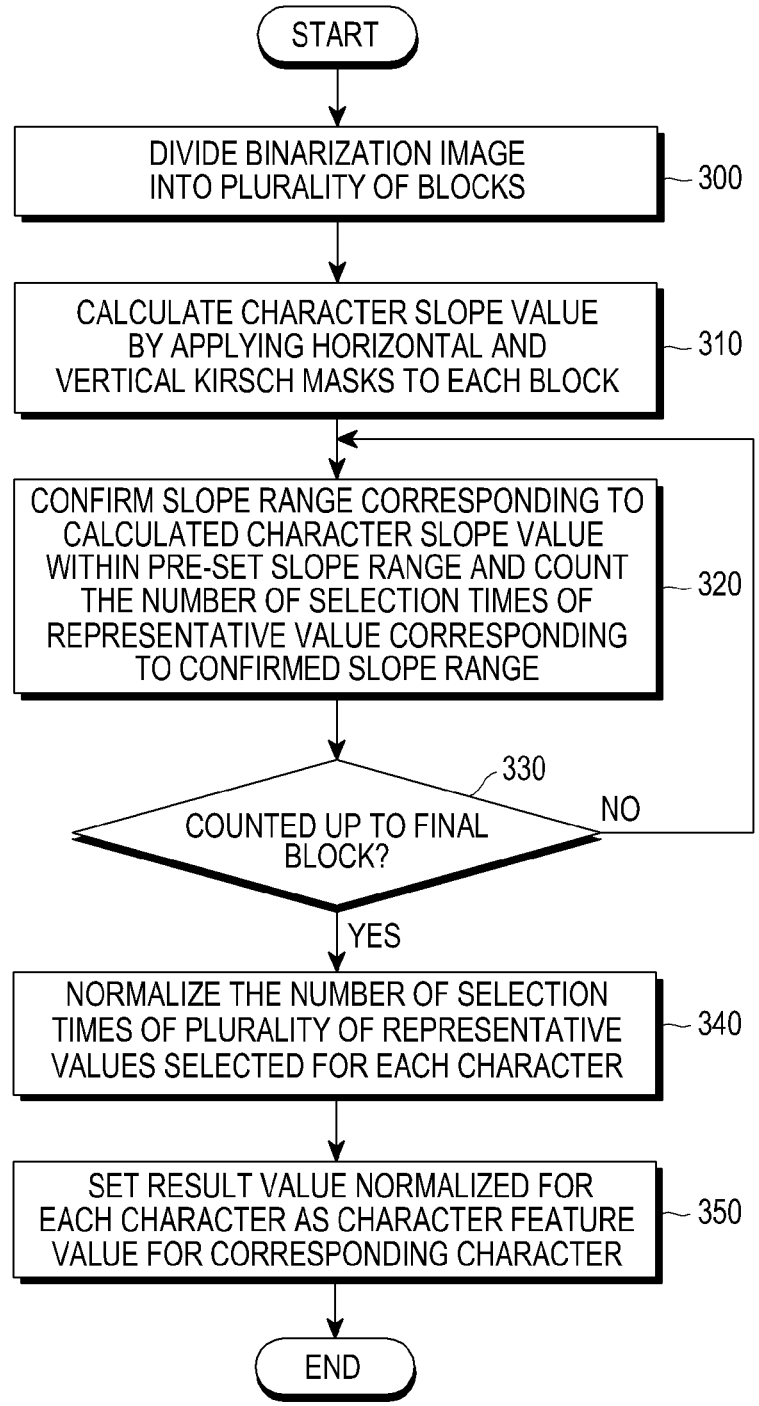
FIG. 3 is a flowchart illustrating a process of setting a character feature value in a character feature value extractor, according to an embodiment of the present invention.

FIG. 3 is a flowchart illustrating a process of setting a character feature value in the character feature value extractor 120 of FIG. 1, according to an embodiment of the present invention.

In the current embodiment, a process of setting a character feature value of a specific character will be described as an example.

Referring to FIG. 3, in step 300, the character feature value extractor 120 divides the generated binarization image into a plurality of blocks.

In step 310, the character feature value extractor 120 applies horizontal and vertical Kirsch masks to each of the divided blocks and calculates a character slope value for each of areas to which the Kirsch masks are applied.

Step 310 of FIG. 3 will now be described in detail with reference to FIG. 4. The character feature value extractor 120 of FIG. 1 may apply a horizontal Kirsch mask having a size of 3 pixels×3 pixels as shown in FIG. 4B and a vertical Kirsch mask having a size of 3 pixels×3 pixels as shown in FIG. 4C to a block 400 divided blocks as shown in FIG. 4A.

For example, in the case of a block comprised of character pixels and background pixels as shown in FIG. 4D, the character feature value extractor 120 calculates a result value Gx=2 by applying the vertical Kirsch mask to an area 410 and calculates a result value Gy=2 by applying the horizontal Kirsch mask to the area 410. Here, a character slope value Gradient is calculated by $$\tan^{-1}\left(\frac{Gy}{Gx}\right),$$

and the character slope value Gradient is 1, i.e., 45°.

In step 320, the character feature value extractor 120 of FIG. 1 confirms a slope range corresponding to the calculated character slope value from among preset slope ranges and counts the number of selection times of a representative value corresponding to the confirmed slope range.

The preset slope ranges indicate that a representative value is set to each of angle ranges by dividing $2\pi$ based on a reference angle. If the reference angle is 45°, 360°, i.e., $2\pi$, is divided into 8 ranges as shown in FIG. 4E, and representative values corresponding to the 8 ranges can be set to 0-7, respectively.

The character feature value extractor 120 then confirms a representative value, 7, corresponding to a slope range including the calculated character slope value, 45°, and counts the number of selection times of the confirmed representative value, 7, by 1.

In step 330, the character feature value extractor 120 of FIG. 1 calculates a character slope value by applying the horizontal and vertical Kirsch masks up to the final block, confirms a slope range corresponding to the calculated character slope value, determines whether the number of selection times of a representative value has been counted, and if these procedures have been completed up to the final block, the process proceeds to step 340, otherwise the process proceeds to step 300 to calculate a character slope value for each block.

In step 340, the character feature value extractor normalizes count-completed result values for each character. The character feature value extractor 120 normalizes the result values for each character to a value between 0 and 1, wherein the result values are divided by a value obtained by adding a height of a single divided block to a width thereof or a value obtained by adding a height of the input image to a width thereof.

In step 350, the character feature value extractor 120 sets the normalized result value for each character as a character feature value for the corresponding character and ends the process of setting a character feature value.

Referring back to FIG. 2, in step 230, the character recognizer 130 of FIG. 1 outputs a character recognition result by using a character group classification neural network and character recognition neural networks, which are included in a two-stage neural network using a character feature value set for each character as an input.

Figure 5:
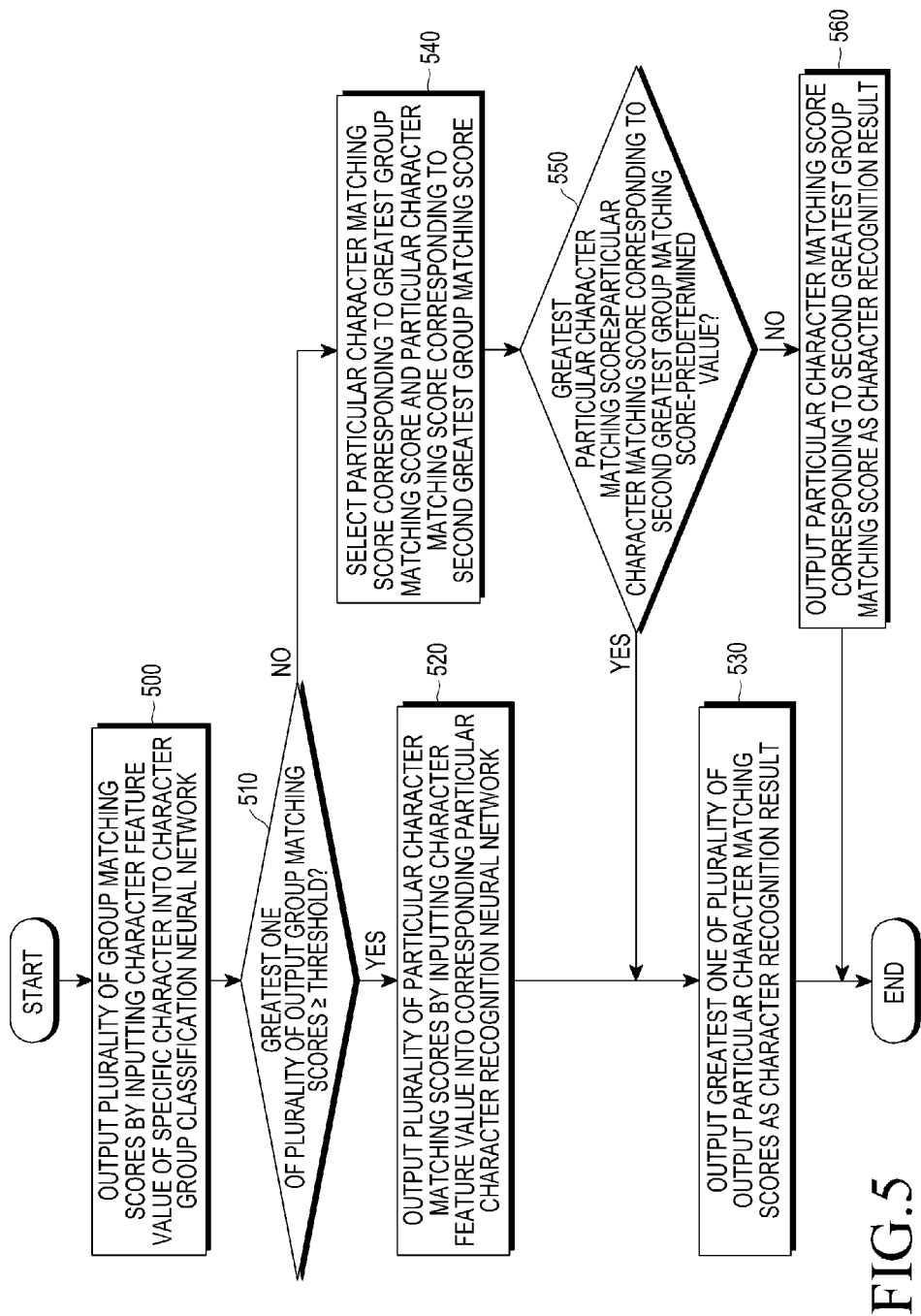
FIG. 5 is a flowchart illustrating a process of outputting a character recognition result by using a two-stage neural network in a character recognizer, according to an embodiment of the present invention.

FIG. 5 is a flowchart illustrating a process of outputting a character recognition result by using a two-stage neural network in the character recognizer 230 of FIG. 2, according to an embodiment of the present invention.

Referring to FIG. 5, in step 500, the character recognizer 230 of FIG. 2 outputs a plurality of character group matching scores by inputting a character feature value set for each character into the character group classification neural network. The character group classification neural network can be shown as in FIG. 6A.

In step 510, the character recognizer 130 of FIG. 1 selects the greatest character group matching score having the greatest value from among the plurality of output character group matching scores and determines whether the selected greatest character group matching score is greater than or equal to a preset threshold.

If the greatest character group matching score is greater than or equal to the preset threshold, the character recognizer 130 proceeds to step 520, and if the greatest character group matching score is less than the preset threshold, the character recognizer 130 proceeds to step 540.

In step 520, the character recognizer 130 outputs a plurality of character matching scores by inputting the character feature value to a corresponding character recognition neural network. The character recognizer 130 delivers the character feature value to a character recognition neural network corresponding to a node from which the greatest character group matching score is output.

In step 530, the character recognizer 130 determines the greatest character matching score from among the plurality of output character matching scores as a final result value for character recognition.

In step 540, the character recognizer 130 selects a plurality of character matching scores output after inputting the character feature value, which has been input to the character group classification neural network, to the corresponding character recognition neural network and a character matching score output after inputting the character feature value to a character recognition neural network corresponding to the second greatest character group.

In step 550, the character recognizer 130 determines whether the greatest character matching score is greater than or equal to a value obtained by subtracting a predetermined value from the character matching score corresponding to the second greatest character group.

If the greatest character matching score is greater than or equal to the value obtained by subtracting the predetermined value from the character matching score corresponding to the second greatest character group, the character recognizer 130 proceeds to step 530 to output the greatest character matching score as a final result value for character recognition.

If the greatest character matching score is less than the value obtained by subtracting the predetermined value from the character matching score corresponding to the second greatest character group, the character recognizer 130 proceeds to step 560 to output the character matching score corresponding to the second greatest character group as a final result value for character recognition.

As described above, the present invention calculates character slope direction information for each character and performs character recognition through a two-stage neural network by using the calculated character slope direction information as a character feature value, thereby decreasing a probability of wrongly recognizing a similar character and increasing a recognition ratio of each character.

While the invention has been shown and described with reference to a certain embodiment thereof, it will be understood by those skilled in the art that various changes in form and details may be made therein without departing from the spirit and scope of the invention as defined by the appended claims and their equivalents.

What is claimed is:

1. A character recognition apparatus comprising:
   a binarizer for binarizing an input image;
   a character extractor for extracting at least one character area from the binarized image;
   a character feature value extractor for calculating a slope value of the extracted at least one character area and setting the calculated slope value as a character feature value; and
   a character recognizer for recognizing a character by using a neural network for recognizing a plurality of characters by receiving the set character feature value, wherein the character feature value extractor divides the at least one character area into a plurality of block areas, calculates character slope direction information for each of the plurality of divided block areas, gathers the character slope direction information calculated for each of the block areas, and sets the gathered value as a character feature value for each character area, and
   wherein the character feature value extractor presets representative values respectively corresponding to a plurality of slope ranges, calculates a character slope value for each of the plurality of divided block areas, counts the number of selection times of a preset slope range corresponding to a slope range in which the calculated character slope values is included from among the plurality of preset slope ranges, normalizes a count value accumulated for each of the plurality of preset slope ranges after completing the count for the plurality of divided block areas, and sets the normalized values as a character feature value of a specific character.

2. The character recognition apparatus of claim 1, wherein the character feature value extractor calculates the character slope value by using a horizontal Kirsch mask and a vertical Kirsch mask.

3. The character recognition apparatus of claim 1, wherein the neural network for recognizing a plurality of characters comprises:
   a character group classification neural network for classifying a character group according to the received character feature value; and
   character recognition neural networks for recognizing a character according to the received character feature value.

4. The character recognition apparatus of claim 3, wherein the character recognizer outputs a character group matching score for a character group including a character having the received character feature value if the received character feature value is input to the character group classification neural network, and outputs a character matching score for the having the received character feature value, if the received character feature value is input to the character recognition neural networks.

5. The character recognition apparatus of claim 4, wherein the character recognizer outputs a plurality of character group matching scores through the character group classification neural network, compares the greatest of the plurality of output character group matching scores with a preset threshold, if the greatest character group matching score is greater than or equal to the preset threshold, delivers the character feature value to a corresponding character recognition neural network, and determines the greatest of character matching scores output from the corresponding character recognition neural network as a final result value for the character recognition.

6. A character recognition apparatus comprising:
   a binarizer for binarizing an input image;
   a character extractor for extracting at least one character area from the binarized image;
   a character feature value extractor for calculating a slope value of the extracted at least one character area and setting the calculated slope value as a character feature value; and
   a character recognizer for recognizing a character by using a neural network for recognizing a plurality of characters by receiving the set character feature value, wherein, if the greatest character group matching score is less than the preset threshold, the character recognizer compares the character matching score output after inputting the character feature value to the corresponding character recognition neural network with a character matching score corresponding to the second greatest character group, determines whether the greatest character matching score is greater than or equal to a value obtained by subtracting a predetermined value from the character matching score corresponding to the second greatest character group, and if the greatest character matching score is greater than or equal to the value obtained by subtracting the predetermined value from the character matching score corresponding to the second greatest character group, outputs the greatest character matching score as a final result value for the character recognition.

7. The character recognition apparatus of claim 6, wherein, if the greatest character matching score is less than the value obtained by subtracting the predetermined value from the character matching score corresponding to the second greatest character group, the character recognizer outputs the character matching score corresponding to the second greatest character group as a final result value for the character recognition.

8. A character recognition method comprising:
   binarizing an input image;
   extracting at least one character area from the binarized image;
   calculating a slope value of the extracted at least one character area and setting the calculated slope value as a character feature value; and
   recognizing a character by using a neural network for recognizing a plurality of characters by receiving the set character feature value,
   wherein setting the character feature value comprises:
   dividing the at least one character area into a plurality of block areas;
   calculating character slope direction information for each of the plurality of divided block areas;
   gathering the character slope direction information calculated for each of the block areas;
   setting the gathered value as a character feature value for each character area;
   presetting representative values respectively corresponding to a plurality of slope ranges;
   calculating a character slope value for each of the plurality of divided block areas;
   counting the number of selection times of a preset slope range corresponding to a slope range in which the calculated character slope values is included from among the plurality of preset slope ranges; and
   normalizing a count value accumulated for each of the plurality of preset slope ranges after completing the count for the plurality of divided block areas and setting the normalized values as a character feature value of a specific character.

9. The character recognition method of claim 8, wherein calculating the character slope value comprises:
   calculating the character slope value by using a horizontal Kirsch mask and a vertical Kirsch mask.

10. The character recognition method of claim 8, wherein the neural network comprises:
    a character group classification neural network for classifying a character group according to the received character feature value; and
    character recognition neural networks for recognizing a character according to the received character feature value.

11. The character recognition method of claim 10, wherein recognizing the character comprises:
    outputting a plurality of character group matching scores through the character group classification neural network;
    comparing the greatest of the plurality of output character group matching scores with a preset threshold;
    if the greatest character group matching score is greater than or equal to the preset threshold, delivering the character feature value to a corresponding character recognition neural network and determining the greatest of character matching scores output from the corresponding character recognition neural network as a final result value for the character recognition.

12. The character recognition method of claim 11, further comprising:
    if the greatest character group matching score is less than the preset threshold, comparing a plurality of character matching scores output after inputting the character feature value to the corresponding character recognition neural network with a character matching score corresponding to the second greatest character group;
    if the greatest of the plurality of character matching scores is greater than or equal to a value obtained by subtracting a predetermined value from the character matching score corresponding to the second greatest character group, outputting the greatest character matching score as a final result value for the character recognition.

13. The character recognition method of claim 12, further comprising:
    if the greatest character matching score is less than the value obtained by subtracting the predetermined value from the character matching score corresponding to the second greatest character group, outputting the character matching score corresponding to the second greatest character group as a final result value for the character recognition.

* * * * *